United States Patent [19]
Smith

[11] 3,929,058
[45] Dec. 30, 1975

[54] VALVE ACTUATOR

[75] Inventor: Joling P. Smith, Houston, Tex.

[73] Assignee: Keystone International, Inc., Houston, Tex.

[22] Filed: Oct. 15, 1973

[21] Appl. No.: 406,164

[52] U.S. Cl. .................. 92/13; 251/58; 74/99 R; 92/59 R
[51] Int. Cl.² ............... F16K 31/165; F15B 15/06; F16H 21/44
[58] Field of Search ......... 92/59 R, 13, 59; 251/58; 74/99 R

[56] References Cited
UNITED STATES PATENTS

| | | | |
|---|---|---|---|
| 2,251,481 | 8/1941 | Corbin, Jr. ............... | 251/58 |
| 2,372,273 | 3/1945 | Hermanson .............. | 251/58 |
| 2,704,086 | 3/1955 | Casali ....................... | 251/58 X |
| 3,160,077 | 12/1964 | Ribeiro et al. ............ | 251/58 X |
| 3,762,280 | 10/1973 | Kreuter .................... | 92/130 X |

*Primary Examiner*—Arnold Rosenthal
*Attorney, Agent, or Firm*—Browning & Bushman

[57] ABSTRACT

A valve actuator for converting linear motion to rotary motion comprising: a housing; a force transmitting member disposed in the housing responsive to pressure applied to one side thereof for travel between first and second terminal positions; a rod member connected to the force transmitting member for reciprocal movement between first and second terminal positions in response to travel of the force transmitting member between its terminal positions; and a crank member connected to the rod member and rotatable in response to reciprocal movement of the rod member, about an axis substantially perpendicular to the axis of the rod member, through an angle of a preselected value. The crank member is provided with first and second pivot connections, at positions radially spaced from the crank axis, by which the rod member may be alternately connected to the crank means for changing the amount of rotational response of the crank member without altering the amount of reciprocal response of the rod member to the travel of the force transmitting member.

9 Claims, 6 Drawing Figures

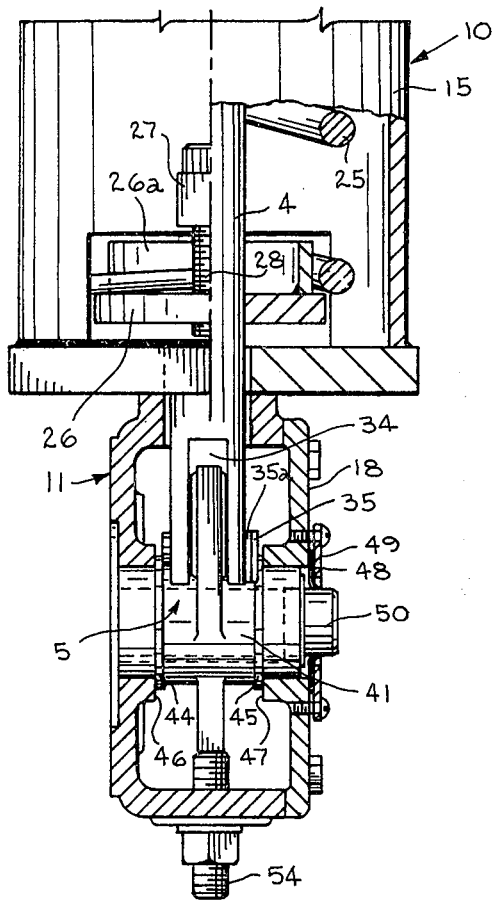
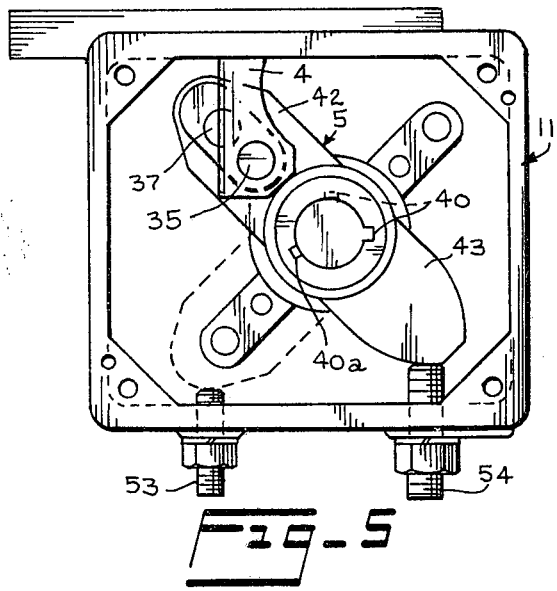
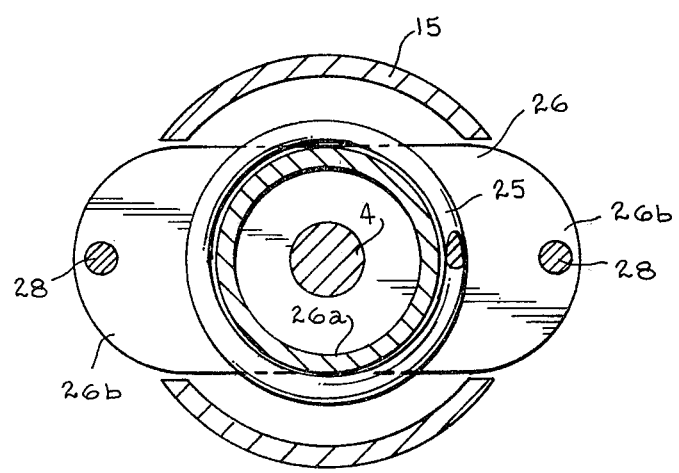

VALVE ACTUATOR

BACKGROUND OF THE INVENTION

1. Field of the Invention

The present invention pertains to actuators. More specifically, the present invention pertains to actuators for converting linear motion to rotary motion. Still more specifically, the present invention pertains to a linear to rotary motion actuator suitable for use with a rotating type valve.

2. Brief Description of the Prior Art

There are many types of actuators suitable for converting linear motion to rotary motion. Several of these actuators are suitable for operating a rotating type valve. Such actuators may be operated manually, hydraulically, electrically, etc.

One type of widely used valve actuator is the diaphragm type which employs a diaphragm member mounted in the actuator housing for movement, in response to pressure applied to one side thereof, between first and second terminal positions. The actuator is also provided with biasing means for biasing the diaphragm member toward one of its terminal positions. A rod member is connected to the diaphragm member for reciprocal movement between first and second terminal positions in response to the travel of the diaphragm member between its terminal positions. The opposite end of the rod member is connected to a crank member which is in turn connected to the operating shaft of the valve to be operated by the actuator. The crank member is rotatable, about the axis of the valve operating shaft, in response to reciprocal movement of the rod member to open and close the valves.

Such operators are commonly designed for ninety degree rotation of the valve operating shaft since many valves move from a completely closed position to a completely open position with 90° rotation. However, it is not uncommon for some rotation of less than 90°, say 60°, to be required, for example, in installations requiring throttling control. In the past, converting a 90° rotating actuator to one of something less has required the replacement of one or more of the actuator components, for example, the crank member. This requires that alternate parts be manufactured and kept in inventory for such changes.

In addition, the biasing member of such actuators, usually coil springs, occasionally need adjustment to increase or decrease the tension exerted thereby. In the past, such adjustments have required disassembly of at least a portion of the actuator. This is of course time consuming and may require that the valve to which the actuator is connected be placed out of service.

Furthermore, such an actuator is usually installed to close or open the valve to which it is connected, depending upon the particular service, when the pressure source to which it is connected fails for some reason. Thus, the actuator may be said to be installed for "fail-open" or "fail-closed" action. To convert an actuator from a "fail-open" operation to "fail-closed" operation may require the replacement of various components or it may require an additional means of engagement of the crank member with the operating shaft of the valve member.

In short, the versatility of the valve operators of the prior art leave something to be desired. Furthermore, to achieve such versatility extra parts must be manufactured and kept in stock for the customer, resulting in increased manufacturing and storage costs not to mention the inconvenience of having to order replacement parts and to replace the original components therewith.

SUMMARY OF THE PRESENT INVENTION

The present invention concerns a valve actuator, preferably of the diaphragm type, which is more versatile, more economic, and easier to maintain than valve actuators of the prior art. The actuator may comprise: a housing; a diaphragm member disposed in the housing for travel between first and second terminal positions, in response to pressure applied to one side thereof; a biasing assembly disposed in the housing biasing the diaphragm member toward the first terminal position; a rod member connected to the diaphragm member for reciprocal movement between first and second terminal positions in response to travel of the diaphragm member between its terminal positions; and a crank member connected to the rod member and the operating shaft of a valve to be operated thereby. The crank member is rotatable, in response to reciprocal movement of the rod member, about the axis of the valve operating shaft, to open and close the valve.

One novel feature of the actuator is that the crank member may be provided with at least two pivot connections, radially spaced from the crank axis, by which the rod member may be selectively connected to the crank member so as to change the amount of crank member rotational response without altering the amount of reciprocal response of the rod member to the diaphragm travel, thus taking advantage of increased torque capabilities. For example, one connection may cause the valve to be rotated 90° whereas the other connection may cause the valve to be rotated only 60° in response to the same linear movement of the rod member. The actuator will have approximately 1.732 times as much torque output as a 60° assembly than as a 90° assembly. Furthermore, a portion of housing of the actuator of the present invention may be transversely positionable, relative to the path of diaphragm travel, in first or second positions, depending on which of the pivot connections the rod and crank members are connected by, to maintain approximate parallel alignment of the rod member with the path of the diaphragm member, regardless of which pivot connection is used for connecting the crank member and rod member.

In addition, the crank member of the present invention may be inverted, relative to the operating shaft of the valve to which it is attached, to change the actuator valve assembly from one of "fail-open" operation to one of "fail-closed" operation, or vice versa. This is done without providing additional means of engagement between the crank member and the valve operating shaft.

Still further, the biasing member, which is usually a coil spring, of the actuator of the present invention, may be provided with means for adjusting the tension of the biasing member externally of the actuator housing. This eliminates the necessity of disassembling the actuator as is the case with actuators of the prior art.

Thus, the valve actuator of the present invention offers versatility and utility not heretofore available with other actuators without replacement of various components thereof. This of course reduces the amount of parts to be manufactured and stocked, consequently reducing the manufacturing and stocking costs.

Many other objects and advantages of the present invention will become apparent from a reading of the following description in conjunction with the accompanying drawings in which:

BRIEF DESCRIPTION OF THE DRAWINGS

FIG. 3, taken along lines 3—3 of FIG. 2, is a partial elevation view, partially in section, of the actuator of FIGS. 1 and 2;

FIG. 4, taken along line 4—4 of FIG. 2, is a cross-sectional view of the actuator more clearly illustrating the biasing spring adjustment thereof;

FIG. 5 is a partial elevation view of the crank area of the actuator of FIG. 2, illustrating the crank member inverted for changing the actuator operation from one of fail-open to one fail-closed.

DESCRIPTION OF A PREFERRED EMBODIMENT

Figure 1:
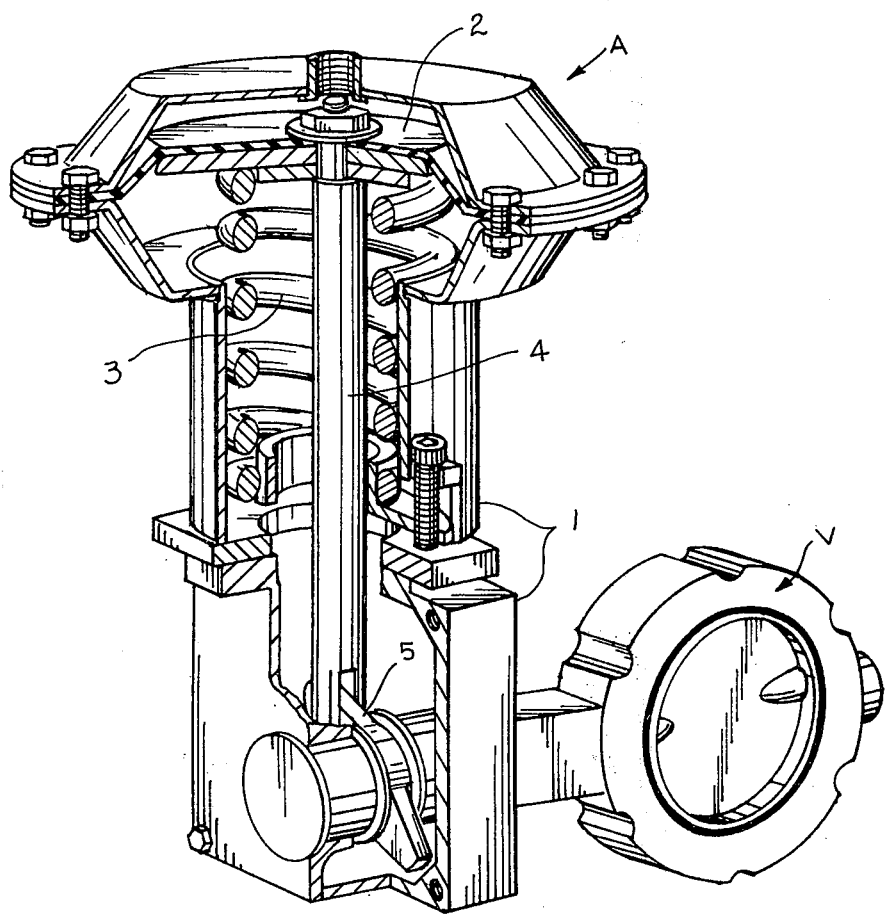
FIG. 1 is a perspective view, with a portion of the housing broken away, illustrating a valve actuator according to the present invention connected to a butterfly valve.

Referring first to FIG. 1, an actuator A, according to preferred embodiment of the invention, is shown connected to a butterfly valve V for operation thereof. The actuator A comprises, in general, a housing 1 which is usually connected to the housing of the valve V, a force transmitting assembly 2, biasing assembly 3, rod member 4, and crank member 5. Briefly stated, travel of the force transmitting assembly 2, in response to pressure applied to one side thereof, reciprocates rod 4 which in turn angularly displaces crank 5 rotating the operating shaft of valve V. In other words, linear movement of force transmitting assembly 2 and rod 4 is translated into rotational movement of crank 5 and the operating shaft of the valve V.

Figure 2:
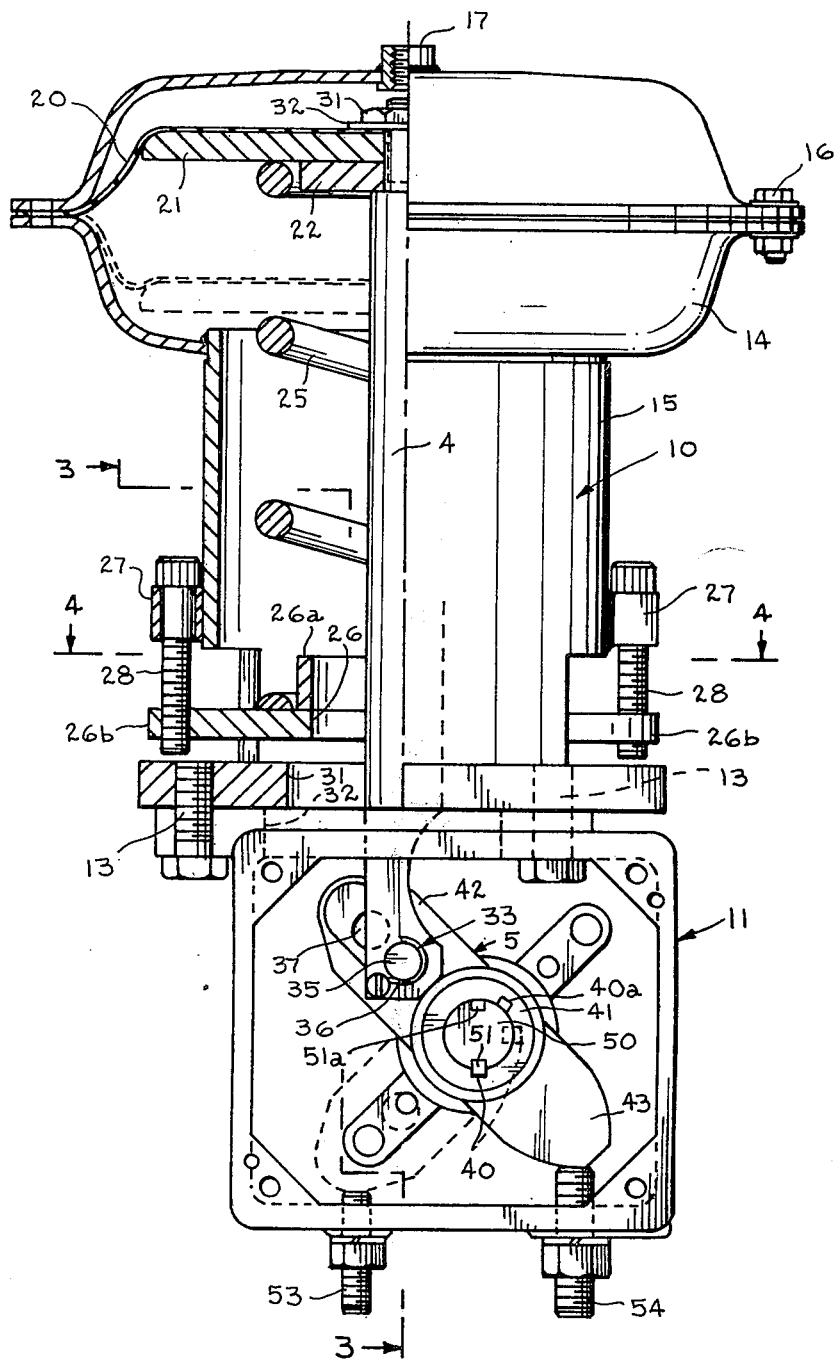
FIG. 2 is an elevation view, partially in section, and with a portion of the housing removed, illustrating a preferred embodiment of the invention connected for 90° rotation of the valve to which it is connected.

Referring more specifically to FIGS. 2–4, a preferred embodiment of the invention will be described in more detail. The housing 1 may be divided into an upper housing assembly 10 and a lower housing assembly 11 connected by bolts 13. The upper housing assembly 10 may in turn comprise a head portion 14 and a cylindrical body portion 15. The head portion 14 may be provided with upper and lower halves, the flanges of which are connected by suitable bolts 16. Thus, the upper half may be removed for assembly and repair. The upper half of the head portion 14 may also be provided with a pressure connection 17 suitable for connection with a pressure source, such as an air supply (not shown). The lower housing assembly 11 is usually connected to the housing of the valve V to which the actuator is attached. A cover plate 18, removed in FIG. 2 but shown in FIG. 3, may be provided for access to certain components of the actuator to be described hereafter.

The force transmitting assembly, generally indicated by the reference numeral 2 in FIG. 1, comprises a flexible diaphragm 20 the peripheral edges of which are sealingly maintained between the halves of housing head 14. Adjacent to and supporting the diaphragm 20 is a circular diaphragm plate 21 and spacer 22. The diaphragm 20, diaphgram plate 21 and spacer 22 are all provided with central apertures through which a threaded end portion of the rod member 4 passes. Nut 31 and washer 32 serve to tightly connect the force transmitting assembly 20, 21 and 22 to the end of rod member 4. The diaphragm 20 and other components of its assembly are movable, in response to pressure applied thereto through connection 17, from an upper terminal position as shown, to a lower terminal position, as illustrated by dotted lines. When pressure is relieved from the upper side of the diaphragm 20, it is forced to return to the upper terminal position by the biasing assembly, generally designated by the reference number 3 in FIG. 1.

The biasing assembly may comprise a helically wound coil spring 25, the upper end of which rests against the under side of the diaphragm plate 21. The lower end of the spring 25 rests against an adjustment plate 26 and surrounds a cylindrical retainer skirt 26a which may be welded to the adjustment plate 26. Sections of the housing body portion 15 are removed to allow extension of lugs 26b of the adjustment plate 26 externally of the housing 10. The housing 10 may be provided with collars 27 through which adjustment screws 28 pass for threaded engagement with threaded holes provided in adjustment plate lugs 26b. Thus, by rotating adjustment screws 28, adjustment plate 26 can be selectively and axially moved, relative to the axis of the rod 4, externally of the housing to adjust the tension on the spring 25.

The end of rod member 4 opposite diaphragm 20 extends through passages 31 and 32 in the housing assemblies into the lower assembly 11. Here the rod member 4 is pivotally connected by a first pivot connection 33 to the crank member 5. The end of the rod member 4 may be slotted, as at 34, to accommodate the crank member 5. The pivot connection may comprise corresponding holes in the rod and crank members through which a pin 35 may be passed. A spring retainer 36 may be attached to the rod for engagement with pin groove 35a, assuring retention of the pin. Another hole 37, providing a second connection as will be more fully understood hereafter, is provided in the crank member 5, radially spaced from the hole in which pin 33 is inserted.

The crank member 5 may comprise a cylindrical hub portion 41 which telescopically receives the end of an operating shaft 50 of a valve, such as the valve V shown in FIG. 1. Projecting radially outward from opposite sides of the hub 41 is an operating arm 42 and a stop arm 43. The operating arm 42 carries the radially spaced holes for the first pivot connection 33 and hole 37 for the second pivot connection. To prevent rotation of the crank member 5, relative to valve operating shaft 50, a keyway 40 may be provided for engagement with a cooperable key 51 on the valve operating shaft. It will thus be understood that rotation of the crank member about its hub axis will effect the rotation of valve operating shaft 50. Another keyway 40a may be provided for 60° operation as will be explained hereafter.

It should also be understood that reciprocation of rod 4 in response to pressure applied to diaphragm 20 will effect the rotation of crank member 5 from a first position, as shown in FIG. 2, to a second position as indicated by the dotted lines. These terminal positions are determined by the capabilities of diaphragm 20 and stop screws 53 and 54. Thus linear movement of rod member 4, in response to movement of diaphragm 20 will effect 90° rotational response of crank member 5, as illustrated in FIG. 2. Assuming that the valve to which the actuator is attached is one of 90° operation, and assuming the valve is fully closed at the upper or first terminal position (as indicated by solid lines) the valve will be fully opened in the bottom or second terminal position (as illustrated by the dotted line representation of crank 5).

As best seen in FIG. 3, the hub 41 of crank member 5 is provided with radial projections 44 and 45 which provide annular bearing surfaces cooperating with bearing surfaces 46 and 47 of the lower housing assembly 11. A wiper seal 48 and a cover plate 49 may be attached to the lower housing assembly 11 at one end of the hub 41. The cover plate 49 may be marked so as to indicate the position of the valve operated by the actuator.

Assuming that the valve to which the actuator of FIGS. 2–4 is attached is one which is closed in the solid line position shown in the drawings, the actuator and valve combination would be considered one of "fail-close" operation. In other words, should for any reason the air to connection 17 fail, the biasing spring 25 would assure that diaphragm 21, rod member 4, crank member 5, and consequently the valve to which it is attached would remain as shown. However, in many operations it may be desirable for the actuator and valve combination to be one which is "fail-open" in operation. The valve of FIGS. 2–4 may be simply converted to such operation by merely inverting the crank member 5, as shown in FIG. 5. As one can see, by inverting the crank member 5, the keyway 40 is displaced by 90°. Rotation of the valve operating shaft 50 to assure that its key 51 mates with the keyway 40 will now place the valve in an opened position. Now reciprocation of the rod 4 and rotation of the crank 5 to the dotted line position shown in FIG. 5, will move the valve through 90° to its closed position. Should the air supply fail, the biasing spring 25 will, of course, return the crank member 5 to the solid line position in which the valve is opened. Thus, the actuator and valve can be said to be "fail-open" in operation. This is very simply and economically done by merely inverting the crank member 5.

Although a 90° rotational output is commonly used for valves which open and close in 90° movement, lesser outputs are sometimes desired for some installations. For example, 60° rotation may be desired for some installations where throttling control is needed. The actuator of the present invention could be converted to one of less rotation, as in other actuators, by simply adjusting stop crews 53 and 54 to reduce the travel of diaphragm 20 and rod member 4. This would, however, not take advantage of the increased torque available with a constant amount of diaphragm travel. To take advantage of the increased torque available operators of the prior art are sometimes converted from one degree of rotational response to another by replacement of one or more components and, in fact, may even require replacement of the entire actuator. The present actuator is designed so that it can be converted from one degree of operation, say 90°, to a lesser degree of operation, say 60°, fully utilizing the increased torque available thereto, by simply changing a few connections.

This is accomplished by first disconnecting the rod member 4 and crank member 5 by removing the pin 35. The key 51 is removed and crank member 5 rotated 15° in a counterclockwise direction to the position shown in FIG. 6. Then the crank 5 is again keyed to the stem 50, keyway 40a being aligned with stem keyway 51a which is diametrically opposed to the first stem keyway. It will be noted that crank 5 has now been angularly displaced by 15° in a counterclockwise direction, as viewed in FIG. 6.

Then the housing subassembly connection bolts 13 are removed allowing rotation of the upper housing assembly 10, relative to the lower housing assembly 11. The upper housing assembly 10 is rotated 180° and the connection holes are realigned with the connecting screws 13. It will be noted that the connection holes in the flanges of the upper housing assembly 10 are offset or eccentrically disposed relative to the axis of the rod member 4. Thus, when the upper housing assembly 10 is rotated 180° and realigned with the connecting screws 13, the upper housing assembly 10 is transversely displaced, relative to its original position so that the axis of the rod member 30 is transversely shifted a distance substantially equal to the distance between the first pivot connection 33 on crank member 5 and the hole 37 for the second pivot connection.

Figure 6:
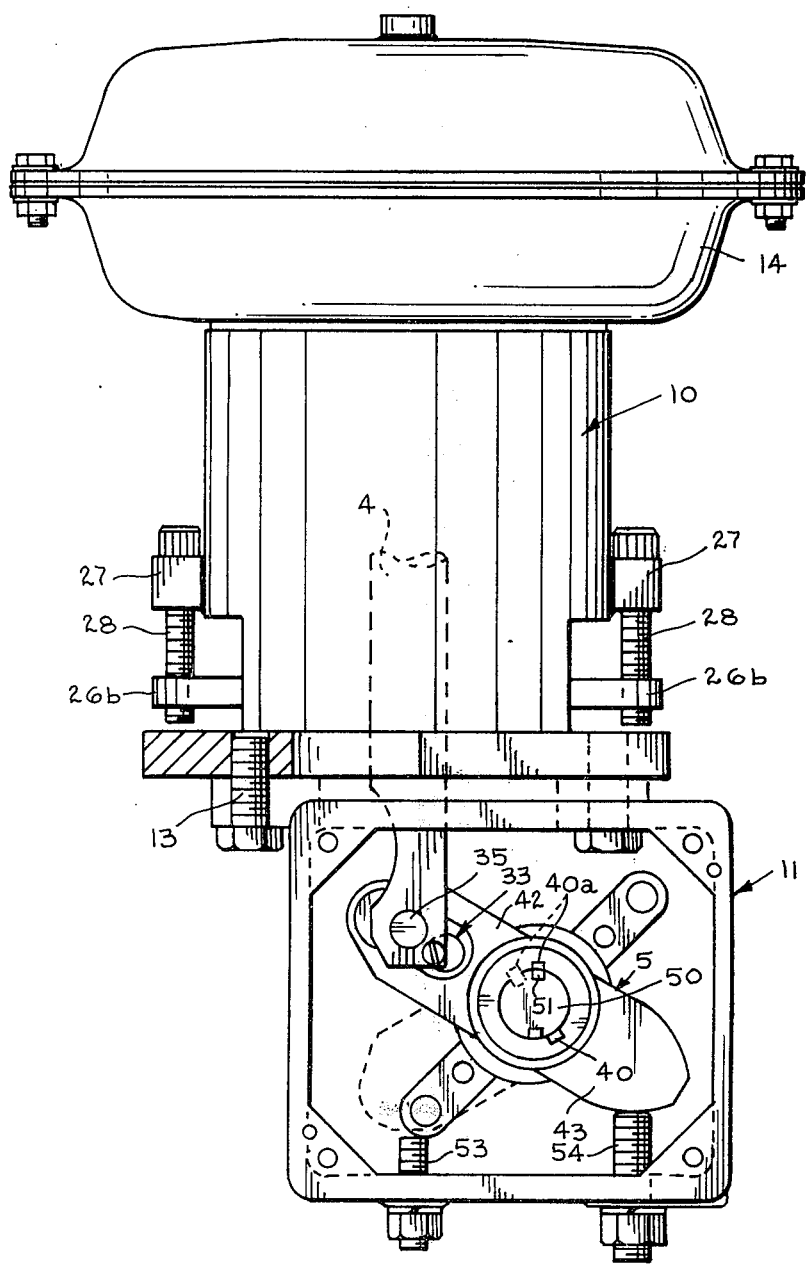
FIG. 6 is an elevation view, partially in section, similar to FIG. 2, showing the conversion of the actuator from one of 90° to one of 60° rotational response.

Once the upper housing assembly 10 has been rotated and reconnected it will assume the position shown in FIG. 6. It will also be noted that the rod member 4 has been shifted so that it can be reconnected with hole 37, at the second pivot connection on crank 5 maintaining the rod member 30 in a substantially parallel position with respect to its original position (as in FIG. 2). Now reciprocation of the rod member 4, in response to pressure applied to diaphragm 20 will, as in FIG. 2, cause the crank member 40 to rotate. However, since the rod and crank are connected at a longer radius arm the same amount of linear travel of the rod member 4 will effect a lesser amount of rotation of the crank member 5 and increased torque output. In fact, rotation for the particular embodiment shown is reduced from the original 90° to 60°. The additional torque output available with the same amount of diaphragm travel is fully utilized.

Thus, reduced rotational response of the crank member 5 is accomplished by merely disconnecting the rod member and the upper housing assembly 10, rotating them 180°, reconnecting them in the position of FIG. 6 in which the rod and crank member are connected by the second pivot connection. No additional parts are required. This is highly desirable from both a manufacturing and stocking of parts viewpoint.

STATEMENT OF OPERATION

Referring once again to FIG. 1, operation of the actuator A and valve V will be summarized. It will be understood that operation is similar whether the actuator is assembled as in FIG. 2 or as in FIG. 6. Initially, as shown, the valve V is in its closed position and the diaphragm assembly 2 is resting at its upper terminal position. Pressure is applied to the upper side of the diaphragm assembly 2 causing the diaphragm assembly 2 to travel to a lower terminal position (see dotted lines in FIG. 2). During its travel the diaphragm assembly 2 causes the rod member 4 to be axially displaced. Axial movement of the rod member 4 causes the crank assembly 5 to rotate in response thereto through an angle of 90°, if assembled as in FIG. 2 (60° if assembled as in FIG. 6). Since the crank member is attached to the operating stem of the valve V the valve will be rotated to its fully opened position. To close the valve, pressure is simply relieved from the upper side of the diaphragm assembly 2, allowing the biasing assembly 3 to return the diaphragm assembly 2 and rod member 4 to their initial or upper terminal positions. This of course returns the crank assembly 5 to its initial position and closes the valve V. It will be understood that should the air supply fail for any reason, the actuator and valve will assume their initial or closed positions.

As understood from the foregoing description, the valve and actuator assembly, when connected for 90° operation as in FIG. 2, can be easily converted from one of "fail-close" operation to one of "fail-open" operation by merely inverting the crank assembly 5. Conversion from 90° rotational response to one of lesser rotational response is also easily accomplished by simple disconnection and rotation of the upper housing and rod and reconnection in the shifted or offset position with the rod member attached to the second pivot connection of the crank 5. As is also understood from the foregoing description, tension of the biasing assembly 3 may be easily adjusted externally of the actuator housing.

Although only one embodiment of the invention has been described herein, many others will be apparent to those skilled in the art without departing from the spirit of the invention. It is, therefore, intended that the scope of the invention be limited only by the claims which follow.

I claim:
1. An actuator for converting linear motion to rotary motion comprising:
   a. housing means;
   b. force transfer means disposed in said housing means for movement from one terminal position in said housing means toward another;
   c. means associated with said housing means for effecting movement of said force transfer means between said terminal positions in said housing;
   d. a substantially rigid rod member connected to said force transfer means for reciprocal movement between first and second terminal positions during said travel of said force transfer means between its terminal positions; and
   e. crank means connected to said rod member and rotatable about a fixed axis through an angle of a preselected value in response to said reciprocal movement of said rod member;
   f. said rod member being selectively and pivotally connectable directly to said crank means at either of first and second pivot points on said crank means at positions radially spaced from said crank axis to change the angle of rotation of said crank means without altering the amount of said rod member reciprocal movement,
   said actuator including means for shifting said rod member transversely to the axis of the path of travel of said force transfer means such that the axis of said rod member when connected at said first pivot point is substantially parallel to the axis of said rod member when connected at said second pivot point, when said force transfer means is at one of its terminal positions.

2. The actuator of claim 1 in which at least a portion of said housing means and said force transfer means are positionable, in first or second positions, depending on whether said rod member and said crank means are connected at said first or said second pivot points, respectively, to maintain said parallel alignment of said rod member.

3. The actuator of claim 2 in which said housing means comprises first and second connected portions, said first portion being disconnectable from said second portion and rotatable about its axis for reconnection in said second position eccentrically related to said first position to maintain said parallel alignment of said rod member.

4. The actuator of claim 3 in which said rotation in 180° relative to said first position.

5. The actuator of claim 1 in which said force transfer means comprises a pressure responsive member responsive to fluid pressure applied to one side thereof to move said rod member from one of its terminal positions to another.

6. The actuator of claim 1 in which said force transfer means comprises biasing means adjacent said pressure responsive member biasing said pressure responsive member in a direction for moving said rod member from said another terminal position toward said one terminal position.

7. The actuator of claim 6 in which said pressure responsive member comprises a diaphragm centrally connected to said rod member and sealingly connected around its periphery to said housing means.

8. The actuator of claim 6 in which said biasing means comprises spring means and adjustment means adjacent thereto, said adjustment means being manipulatable externally of said housing means for varying the biasing force of said spring means.

9. The actuator of claim 8 in which said adjustment means comprises a plate member having a central aperture through which said rod member passes and having lugs on opposite sides of said aperture mounted for reciprocal adjustment relative to said rod member axis for said varying of said biasing force.

* * * * *

UNITED STATES PATENT AND TRADEMARK OFFICE
CERTIFICATE OF CORRECTION

PATENT NO. : 3,929,058
DATED : December 13, 1975
INVENTOR(S) : JOPLING P. SMITH

It is certified that error appears in the above-identified patent and that said Letters Patent are hereby corrected as shown below:

In Column 3, line 24, after the word one, insert the word --of--.

In Column 3, line 31, begin line with the word --a--.

In Column 5, line 23, after the word air, delete "." and insert therefor --supply--.

In Column 8, line 25, after the word rotation, delete "in" and insert therefor --is--.

The Inventor's name should be --Jopling P. Smith--.

Signed and Sealed this twenty-fifth Day of May 1976

[SEAL]

Attest:

RUTH C. MASON
Attesting Officer

C. MARSHALL DANN
Commissioner of Patents and Trademarks